United States Patent [19]

Nagai et al.

[11] Patent Number: 4,489,578
[45] Date of Patent: Dec. 25, 1984

[54] SLIDE STOP POSITION CONTROL APPARATUS OF A PRESS

[75] Inventors: Shunichi Nagai; Kazuo Hiramura, both of Komatsu, Japan

[73] Assignee: Kabushiki Kaisha Komatsu Seisakusho, Tokyo, Japan

[21] Appl. No.: 561,815

[22] Filed: Dec. 15, 1983

[30] Foreign Application Priority Data

Dec. 27, 1982 [JP] Japan .......................... 57-195522[U]

[51] Int. Cl.³ ............................................. B21B 37/08
[52] U.S. Cl. ........................................ 72/21; 72/389; 100/53; 192/129 A
[58] Field of Search .............. 72/21, 22, 26, 386, 72/389, 31, 37, 443; 100/53; 192/129 A

[56] References Cited

U.S. PATENT DOCUMENTS

| 3,874,205 | 4/1975 | Roch et al. | 72/22 |
| 4,166,369 | 9/1979 | Nakajima | 72/26 |
| 4,357,820 | 11/1982 | Blanchard | 72/389 |
| 4,358,945 | 11/1982 | Pärtzel | 72/26 |

FOREIGN PATENT DOCUMENTS 92550  3/1980  Japan ........................................ 72/31

Primary Examiner—E. Michael Combs
Assistant Examiner—Charles Rosenberg
Attorney, Agent, or Firm—Frost & Jacobs

[57] ABSTRACT

A slide stop position control apparatus of a press machine which can automatically effect slide stop position adjustment when the die and/or the punch are changed. The apparatus comprises a first detector for detecting the tip of the punch and a second detector for detecting an upper end of the die when the slide is moved towards the die. The first detector is mounted to a die base and the second detector is mounted to the slide and each detector includes a light emitter and a light receiver. A slide position detector is also provided and all of the detectors are connected to a control unit for controlling a drive unit for the slide.

3 Claims, 7 Drawing Figures

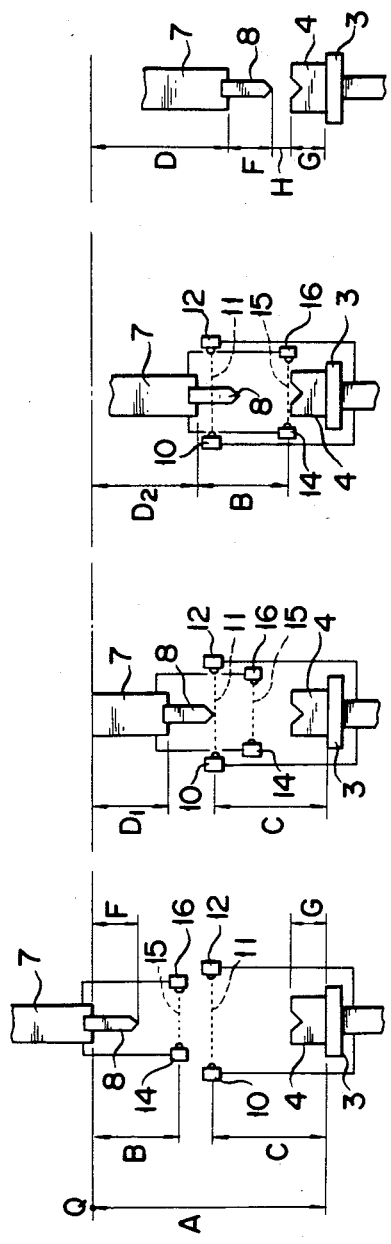

SLIDE STOP POSITION CONTROL APPARATUS OF A PRESS

BACKGROUND OF THE INVENTION

This invention relates to a slide stop position control apparatus adapted to control a slide of a press to stop at a preset position.

The conventional presses such as press brakes used for bending workpiece are disadvantageous in that, because the height of punch and die will change according to the kind of workpiece to be subjected to bending work, even if the temporary stop position of the slide is preset, it is required to reset the position each time punch and die are changed, thus making the operation troublesome.

SUMMARY OF THE INVENTION

It is therefore an object of the present invention to provide a slide stop position control apparatus of a press machine which overcomes the above-noted problem of the prior art.

Another object of the present invention is to provide a slide stop position control apparatus which can automatically adjust a slide stop position to a desired level whenever a punch and a die are changed to new ones having different dimensions and configurations so that a preset distance may be always kept between the tip of the punch and the upper surface of the die.

In accordance with an aspect of the present invention, there is provided a slide stop position control apparatus of a press machine including a die base, a die mounted on said die base, a slide movable towards and away from said die, and a punch rigidly mounted to said slide, the slide stop position control apparatus, comprising: means mounted to said die base for detecting the tip of said punch when said slide is moved towards said die; means mounted to said slide for detecting an upper end of said die when said slide is moved towards said die; means for detecting a slide position; drive means for moving said slide towards and away from said die; and control unit means connected with all of said detector means for controlling the movement of said drive means in response to detection signals from all of said detector means.

The above and other objects, features and advantages of the present invention will be readily apparent from the following description taken in conjunction with the accompanying drawings.

BRIEF DESCRIPTION OF THE DRAWINGS

FIGS. 4A to 4D are views explanatory of operation of the present invention.

DESCRIPTION OF THE PREFERRED EMBODIMENT

Figure 1:
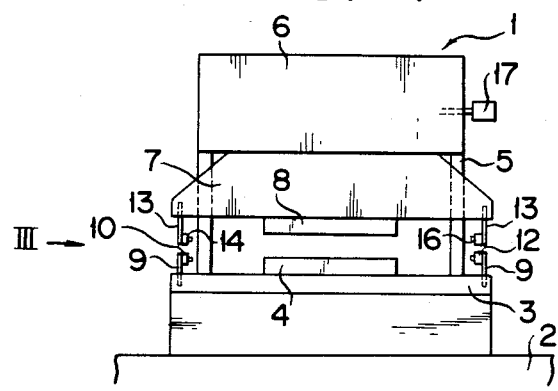
FIG. 1 is a schematic front elevational view of a press machine incorporating the control apparatus of the present invention.
Figure 2:
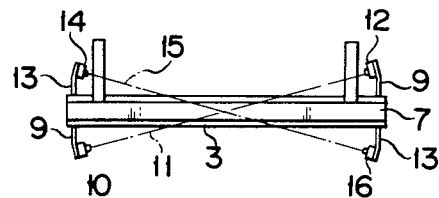
FIG. 2 is a view explanatory of the arrangement of light emitters and light receivers according to the present invention.
Figure 3:
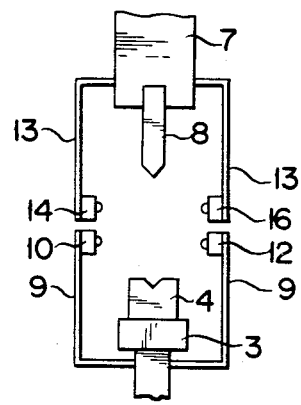
FIG. 3 is a fragmentary view as viewed from an arrow III in FIG. 1.

The present invention will now be described in detail by way of example only with reference to the accompanying drawings. In FIG. 1, reference numeral 1 denotes a press body which includes a die base 3 mounted on a bed 2, a die 4 mounted on the die base 3, uprights 5 standing vertically from the bed 2, and a slide drive unit 6 supported by the uprights 5 and adapted to move up and down a slide 7 located above the die base 3, the slide 7 having a punch attached to the lower surface thereof, the arrangement being made such that a workpiece, not shown, can be subjected to bending work between the punch 8 and the die 4.

Whilst, approximately L-shaped brackets 9 project from the front face of the die base 3 at one end thereof and the rear face of the die base 3 at the other end thereof respectively, and a light projector 10 is fitted to the upper end of one of the brackets 9. The light beam 11 projected by the projector 10 passes through a central, upper part of the die 4 and reached a light receiver 12 fitted to the upper end of the other bracket 9. Further, the slide 7 has approximately inverted L-shaped brackets 13 projecting from the rear end face of the die base 3 at one end thereof and the front end face of the die base 3 at the other end thereof respectively, one of the brackets 13 having a light projector 14 fitted to the lower end thereof. The light beam 15 projected by the projector 14 intersects the light beam 11 which is projected by the projector 10 above the die 4 and then impinges on a light receiver 16 fitted to the lower end of the other bracket 13. The detection signals converted by the light receivers 12 and 16 into electric signals are transmitted to a control unit, not shown, together with signals sent out from a slide position detector 17 which is, for example, an encoder associated with the slide 7 through an interlocking means, not shown, such as a rack and a pinion, and the slide drive unit 6 is thereby controlled as described below.

When the slide 7 stops at upper dead center Q, the relationship in position of the component parts is as shown in FIG. 4A. In brief, the distance between the upper surface of the die 4 and the upper surface of the die base 3 is represented by G, the height of the beam of light 11 projected by the projector 10 to the light receiver 12 from the upper surface of the die base 3 represented by C, the distance between the lower surface of the slide 7 and the leading end of the punch 8 is by F, the distance between the beam of light projected by the projector 14 to the light receiver 15 and the lower surface of the slide is by B, and the distance between the upper surface of the die base 3 and the lower surface of the slide 7 is by A. When the slide 7 commences to move downwards from the position shown and descends by a distance $D_1$, the light beam 11 between the projector 10 and the light receiver 12 is first blocked by the leading end of the punch 8 so that the leading end can be detected by the light receiver 12 (FIG. 4B). When the slide 7 continues to descend further and descends by distance $D_2$, the light beam 15 between the projector 14 and the light receiver 16 is blocked by the upper surface of the die 4 so that the latter can be detected (FIG. 4C).

Therefore, the length F of the punch 8 fitted to the slide 7 can be obtained as follows.

The distance A between the die base 3 and the slide 7 at its top dead center Q and the distance C between the upper surface of the die base 3 and the light beam 11 are previously known. Therefore, the length of punch 8 can be obtained by measuring by means of a slide position detector 17 the downward stroke $D_1$ of the slide 7, i.e. the distance between the slide 7 at its top dead center Q where it commence downwards stroke and the position where the light beam 11 is blocked by the leading end of the punch 8 and which length can be obtained by the following formula:

$$F = \underline{A} - \underline{C} - D_1$$

wherein the underlines show fixed length.

In the same manner, the height G of the upper surface of the die 4 from the upper surface of the die base 3 is obtained by measuring the downward stroke $D_2$ of the slide 7, i.e. the distance between the slide 7 at its top dead center and the position where the light beam 15 is blocked by the leading end of the punch 8 and which length can be obtained by the following formula.

$$H = \underline{A} - \underline{B} - D_2$$

As the length of the punch 8 and the height of the die 4 are obtained by the above-mentioned procedure, the distance H between the leading end of the punch 8 and the upper surface of the die 4 when the slide 7 has moved over one stroke is obtained by the following formula.

$$H = \underline{A} - F - G - D$$

Therefore, even if the height of the die 4 fitted to the die base 3 and the length of the punch 8 fitted to the slide 7 vary according to the kind of workpiece to be worked, it is possible to stop accurately the leading end of the punch 8 at a desired height H from the upper surface of the die 4 by detecting the height of the die 4 and the length of the punch 8, calculating the stop position by the control system on the basis of the detected values and controlling the slide drive unit 6.

As mentioned in detail hereinabove, according to the present invention, the arrangement is made such that, even if the configuration of the workpiece to be subjected to bending work changes requiring replacements of the die and punch, the stop position of the slide 7 is controlled so that the leading end of the punch 8 can be stopped at a desired height from the upper surface of the die according to the values obtained by detecting the height of the die and the length of the punch by means of the detector adapted to detect the upper surface of the die and the length of the punch and also the slide position signal transmitted by the slide position detector. Therefore, according to the present invention, it is not necessary to reset the stop position of the slide each time replacements of the die and punch are made so that the labour required each time replacements of the die and punch are made can be reduced substantially.

It is to be understood that the foregoing description is merely illustrative of a preferred embodiment of the invention and that the invention is not to be limited thereto, but is to be determined by the scope of the appended claims.

What is claimed is:

1. In a press machine including a die base, a die mounted on said die base, a slide movable towards and away from said die, and a punch rigidly mounted to said slide, a slide stop position control apparatus, comprising:
    means mounted to said die base for detecting the tip of said punch when said slide is moved towards said die;
    means mounted to said slide for detecting an upper end of said die when said slide is moved towards said die;
    means for detecting a slide position;
    drive means for moving said slide towards and away from said die; and
    control unit means connected with all of said detector means for controlling the movement of said drive means in response to detection signals from all of said detector means.

2. A slide stop position control apparatus according to claim 1 wherein said first recited means comprises a first light emitter mounted on the front side of said die base at one end thereof and a first light receiver mounted on the rear side of said die base at the other end thereof and wherein said second recited means comprises a second light emitter mounted on the rear side of said slide at one end thereof and a second light receiver mounted on the front side of said slide at the other end thereof.

3. A slide stop position control apparatus according to claim 2 wherein said second recited means is positioned above said first recited means when said slide is positioned at its top dead center.

* * * * *